United States Patent
Blanchard et al.

(10) Patent No.: US 10,752,191 B2
(45) Date of Patent: Aug. 25, 2020

(54) VEHICLE FAIRING INCLUDING AN ELECTRICAL ROUTING

(71) Applicant: Airbus Operations Limited, Bristol (GB)

(72) Inventors: Jack Blanchard, Bristol (GB); Anthony Bryant, Bristol (GB)

(73) Assignee: Airbus Operations Limited, Bristol (GB)

( * ) Notice: Subject to any disclaimer, the term of this patent is extended or adjusted under 35 U.S.C. 154(b) by 1023 days.

(21) Appl. No.: 15/222,703

(22) Filed: Jul. 28, 2016

(65) Prior Publication Data

US 2017/0028947 A1 Feb. 2, 2017

(30) Foreign Application Priority Data

Jul. 28, 2015 (GB) .................................. 1513267.3

(51) Int. Cl.
- *B60R 16/03* (2006.01)
- *B64C 3/00* (2006.01)
- *B64D 37/04* (2006.01)

(52) U.S. Cl.
CPC ................ *B60R 16/03* (2013.01); *B64C 3/00* (2013.01); *B64D 37/04* (2013.01)

(58) Field of Classification Search
CPC ........ B64C 7/00; B64D 2221/00; B60R 16/03
See application file for complete search history.

(56) References Cited

U.S. PATENT DOCUMENTS

| | | | | |
|---|---|---|---|---|
| 4,204,213 A | * | 5/1980 | Wheeler | H01Q 1/085 343/706 |
| 4,635,066 A | * | 1/1987 | St. Clair | H01Q 1/282 343/705 |
| 4,869,670 A | * | 9/1989 | Ueda | B60R 16/0207 439/34 |
| 5,527,187 A | * | 6/1996 | Jurasek | H05K 1/0271 439/246 |
| 5,931,682 A | * | 8/1999 | Takiguchi | B60R 16/0207 174/72 A |
| 6,343,954 B1 | | 2/2002 | Facciano et al. | |
| 8,254,136 B2 | * | 8/2012 | Kim | H05K 1/0218 361/748 |
| 2003/0038610 A1 | * | 2/2003 | Munshi | H02J 7/35 320/101 |
| 2005/0225955 A1 | * | 10/2005 | Grebenkemper | H05K 1/0218 361/780 |
| 2008/0185478 A1 | * | 8/2008 | Dannenberg | B64C 1/12 244/119 |

(Continued)

FOREIGN PATENT DOCUMENTS

EP 2 947 972 11/2015
EP 2947972 A1 * 11/2015 ............... B64F 5/00

Primary Examiner — Assres H Woldemaryam
(74) Attorney, Agent, or Firm — Nixon & Vanderhye P.C.

(57) ABSTRACT

A vehicle fairing includes an electrical routing for conducting power and/or control signals between spaced-apart components of a vehicle structure. The vehicle fairing includes an outer surface configured to form part of an outer surface of a vehicle body. The electrical routing includes a printed circuit board having a substrate and a first conductive path for conduction of electrical current or signals provided on the substrate. The substrate is substantially rigid and forms at least a portion of the outer surface of the vehicle fairing.

23 Claims, 7 Drawing Sheets

(56) References Cited

U.S. PATENT DOCUMENTS

| | | | |
|---|---|---|---|
| 2010/0213312 A1* | 8/2010 | Robb | B64C 1/068 |
| | | | 244/1 A |
| 2010/0308169 A1 | 12/2010 | Blanchard et al. | |
| 2011/0221626 A1* | 9/2011 | Hill | B64C 7/00 |
| | | | 342/30 |
| 2011/0256455 A1* | 10/2011 | Coowar | H01G 9/02 |
| | | | 429/247 |
| 2011/0294319 A1* | 12/2011 | Grosse-Plankermann | |
| | | | H01R 25/161 |
| | | | 439/113 |
| 2012/0012703 A1* | 1/2012 | Schmid | B29C 70/86 |
| | | | 244/118.5 |
| 2013/0161094 A1* | 6/2013 | Broughton | F02C 7/12 |
| | | | 174/88 R |
| 2013/0319727 A1* | 12/2013 | Wen | B64C 3/185 |
| | | | 174/117 FF |
| 2014/0332620 A1* | 11/2014 | Earon | B64C 39/024 |
| | | | 244/13 |
| 2016/0126684 A1* | 5/2016 | Wulfhorst | B64C 1/066 |
| | | | 439/529 |
| 2016/0174369 A1* | 6/2016 | Safai | B64C 1/061 |
| | | | 362/382 |
| 2016/0245113 A1* | 8/2016 | Lyders | H05B 3/0014 |

* cited by examiner

VEHICLE FAIRING INCLUDING AN ELECTRICAL ROUTING

RELATED APPLICATION

This application claims priority to Great Britain patent application GB 1513267.3 filed on Jul. 28, 2015, the entirety of which is incorporated by reference.

FIELD

The present invention relates to a vehicle fairing including an electrical routing.

BACKGROUND

Aircraft comprise complex wiring systems for the transmission of power and control signals between the various components and systems of the aircraft. Conventionally, these electrical components/systems are connected by cables routed through the aircraft structure. These cables are conventionally fastened within cable raceways, which are elongate metallic ducts comprising one or more channels in which the cables are retained. The raceways serve the purpose of guiding and securing the cables, protecting the cables from mechanical damage and also protecting them from electro-magnetic hazards (EMH), which include various electrical interferences and threats such as electromagnetic interference (EMI), electromagnetic coupling (EMC) and radio frequency interference (RFI).

The cables may also be provided as an over-braided cable harness, which comprises a bundle of cables within a protective sleeve, of a material such as Nome™, Kevlar™, nylon or other suitable material, and an outer braided metallic mesh. This provides the cables with both mechanical and electrical/EMH protection. The cable harness may then be secured by clips that retain the harness to the aircraft structure or within a raceway.

Such cable harnesses for the transmission of power and signals comprise a large number of components and a high weight of materials and also occupy a large volume of space on or within the vehicle structure. For example, the electrical raceways require mechanical fastening to the vehicle structure, the cables must be fastened within the raceway by clips or other suitable fasteners, and a minimum spacing must be provided between the harness and any conductive (e.g. metallic) structure to which the harness is attached, to reduce the risk of electrical arcing between the harness and the conductive structure should a cable become fretted and the conductive inner wire exposed. The complexity of these cable arrangements also results in a long installation time in the vehicle construction process, and a complex installation process.

In certain areas of an aircraft, cables must be routed externally, such as on the wings where fuel tanks are located. Here, since cables may not pass through the fuel tanks for safety reasons, yet power is required for the fuel pumps within the tanks, the power cables must be provided on the underside of the wing, and then covered with a fairing for environmental protection of the cables and aerodynamic performance of the wing. Again, this is a complex arrangement with long installation time as part of the aircraft construction process, and also results in a number of relatively large additional fairing structures being disposed on the underside of the wing, reducing aerodynamic performance.

It is desirable to provide a vehicle fairing and electrical routing that substantially alleviates or overcomes one or more of the disadvantages mentioned above.

SUMMARY

According to an embodiment of the invention, there is provided a vehicle fairing comprising an electrical routing for conducting power and/or control signals between spaced-apart components of a vehicle structure, the vehicle fairing comprising an outer surface configured to form part of an outer surface of a vehicle body, the electrical routing comprising a printed circuit board having a substrate and a first conductive path for conduction of electrical current or signals provided on the substrate, wherein the substrate is substantially rigid and forms at least a portion of the outer surface of the vehicle fairing The printed circuit board may comprise a multi-layer printed circuit board having a plurality of layers of substrate. The first conductive path may be provided on a first layer of substrate and a second conductive path may be provided on a second layer of substrate, the second conductive path being electrically insulated from the first conductive path.

The second conductive path may be configured to serve as a current return path.

The substrate may be substantially rigid and the electrical routing may comprise a unitary assembly with a protected conductive layer.

The or each conductive layer may be sandwiched between layers of substrate such that the or each conductive layer is embedded within the body of the vehicle fairing.

The printed circuit board substrate(s) may comprise polyether ether ketone (PEEK), polyether ketone ketone (PEKK) or Glass Fibre Reinforced Plastic (GFRP).

The printed circuit board may comprise at least one mounting lug integrally formed with the substrate for securing the printed circuit board to a vehicle structure.

The substrate may form the entire outer surface of the vehicle fairing.

The vehicle fairing may comprise an aircraft wing fairing.

The vehicle fairing may be configured to be positioned on the outer underside of an aircraft wing and to connect a fuel pump within the aircraft wing to a supply of electrical power running along an external surface of the aircraft wing.

The present invention also provides an aircraft structure including an electrical component and, a vehicle fairing as described above connected to the aircraft structure, wherein the electrical routing may be connected to the electrical component for conveying power and/or control signals thereto.

The aircraft structure may comprise a current return network, and the second conductive path may be electrically connected to the current return network.

The printed circuit board may comprise a lead with a connector for electrically connecting the printed circuit board to an electrical system of the aircraft.

The lead may be flexible and may include a non-conductive protective sleeve and an electrically conductive metallic outer braiding.

The aircraft structure may comprise an aircraft wing.

The aircraft wing may comprise a fuel tank, and the electrical component may comprise a fuel pump within the fuel tank, and the electrical routing may be connected to the fuel pump.

BRIEF DESCRIPTION OF THE DRAWINGS

Embodiments of the invention will now be described, by way of example only, with reference to the accompanying drawings, in which.

DETAILED DESCRIPTION

Figure 1:
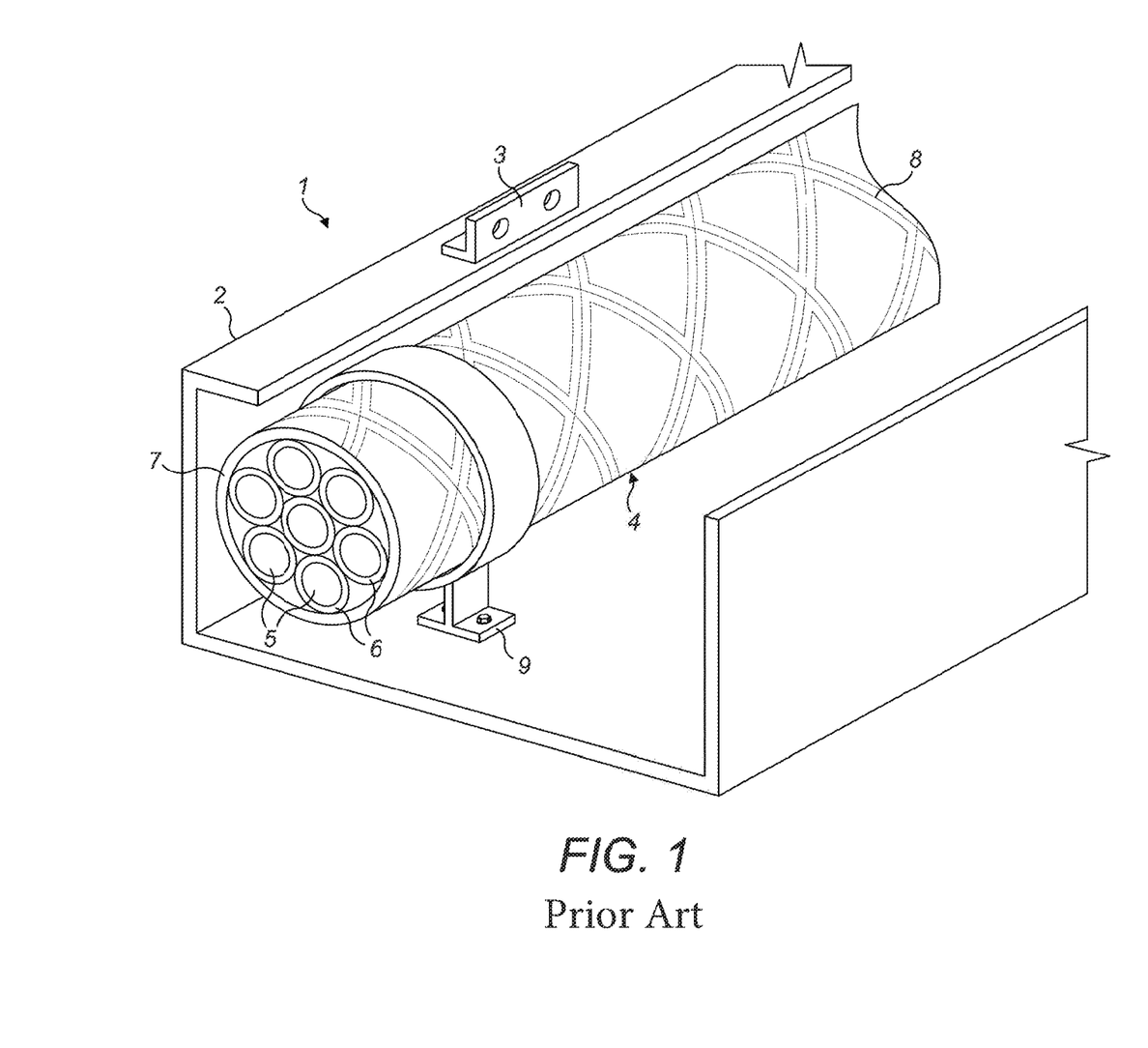
FIG. 1 shows a conventional cable routing used in an aircraft.

Referring now to FIG. 1, a conventional cable routing 1 as used in aircraft, such as commercial airliners, is shown and includes a cable raceway 2 comprising an elongate channel, usually metallic such as aluminium, with mounting lugs 3 for the raceway 2 to be secured to an aircraft structure, such as a fuselage or wing. Within the raceway 2 are cable harnesses 4 (for simplicity, only one is shown in FIG. 1 although usually multiple harnesses would be provided within a raceway). Each harness 4 comprises a bundle of cables 5, each with an insulating outer layer 6, and the bundle is retained within a protective sleeve 7. The sleeve 7 is provided with a metallic over-braiding 8 for electrical and EMH protection of the cables 5 within the harness 4. Each cable harness 4 is fastened to the raceway 2 by a plurality of mounting clips 9. In an alternative conventional configuration, cable bundles may be routed in individual channels within a single raceway structure, and in such a configuration, the cables may not have additional sleeve protection for abrasion or EMI/EMH protection as this is performed by the separating channel walls of the raceway.

It will be appreciated from the above that the cable routing 1 comprises a large number of components and is relatively complex in construction. This increases the cost of the cable routing 1 and it occupies a large volume of space within the aircraft structure and is time consuming to install. Furthermore, if any of the mounting clips 9 fail, the individual cable harnesses 4 within the raceway 2 may move around, resulting in wear of the cable harness 4 and potentially a short-circuit.

Figure 2:
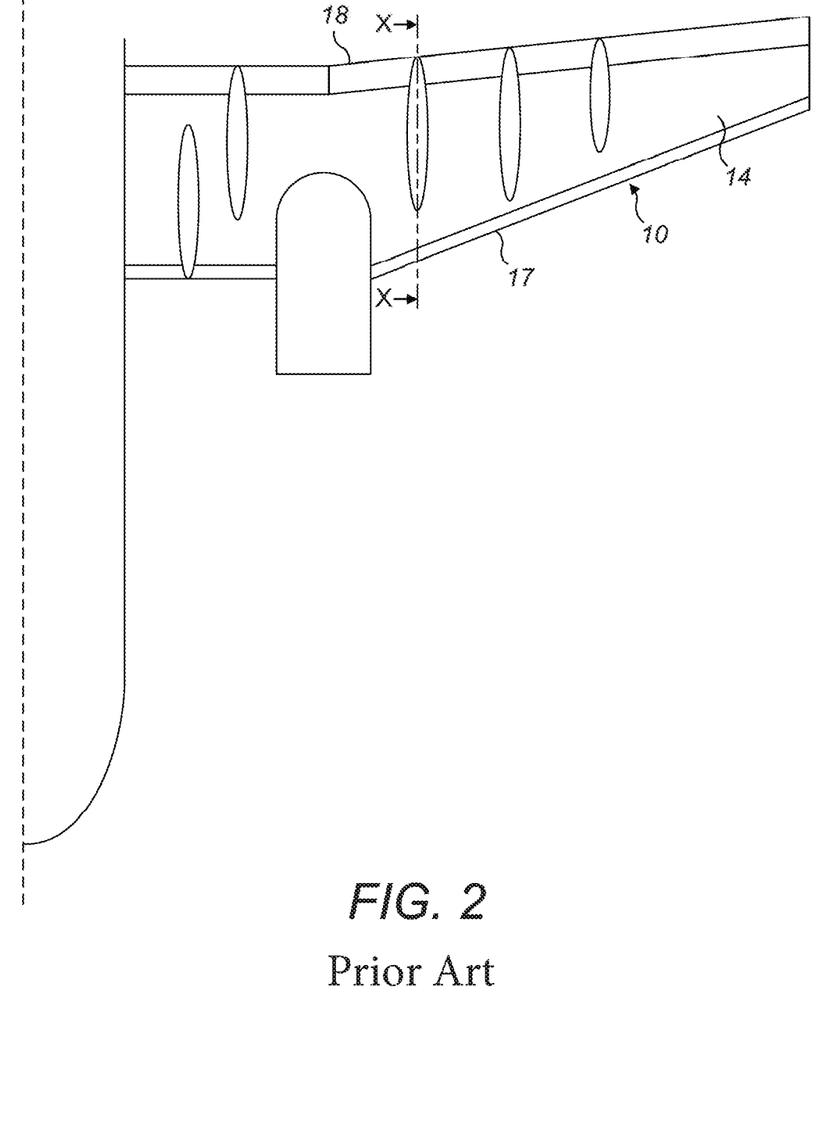
FIG. 2 shows a schematic underside view of one side of a conventional aircraft wing and fuselage.
Figure 3:
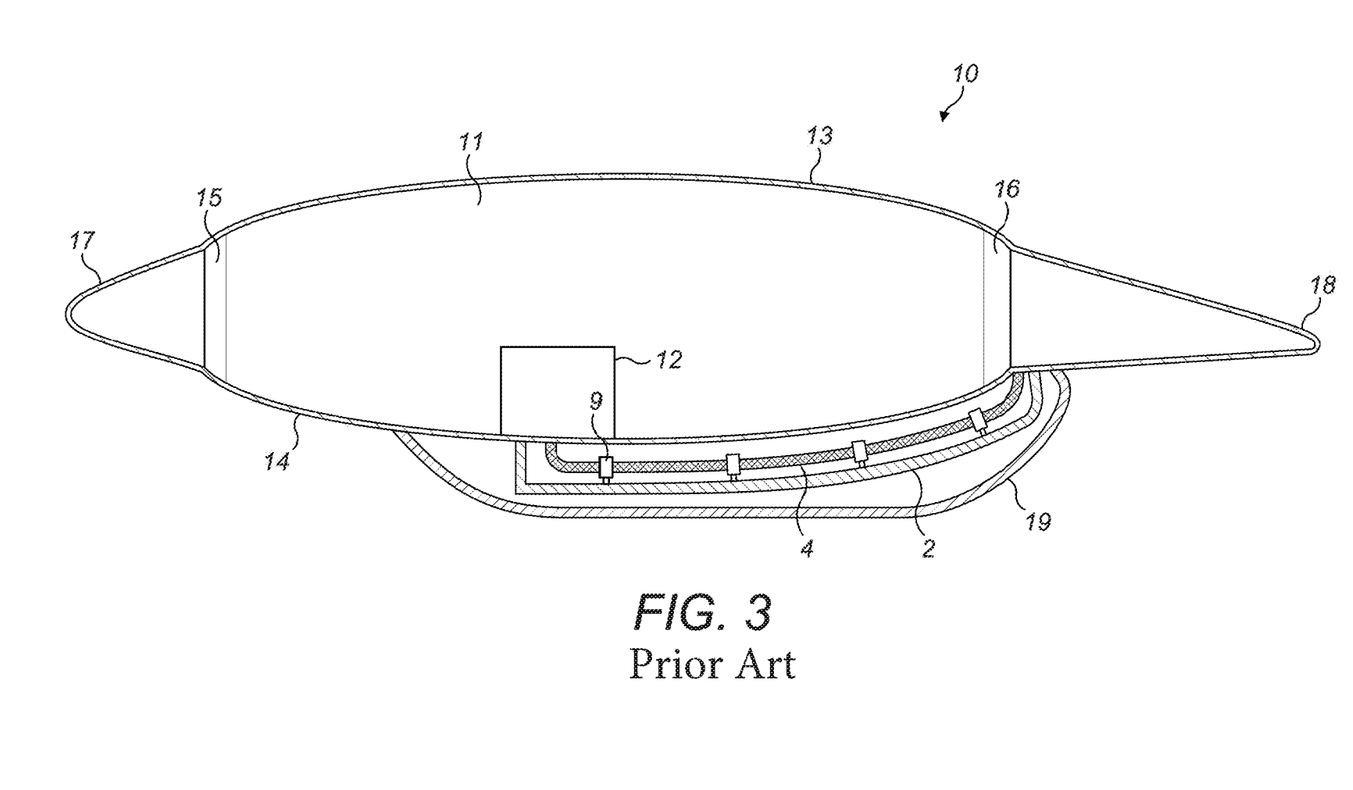
FIG. 3 shows a schematic cross-sectional view of a conventional aircraft wing along the line X-X of FIG. 2.

FIG. 2 shows an underside view of one side of a conventional aircraft fuselage and wing 10, and FIG. 3 shows a cross-section through the wing 10 of FIG. 2 along the line X-X. The wing 10 includes a fuel tank 11 with a fuel pump 12 disposed within the tank. For efficiency of space, in conventional aircraft wing design, an upper surface 13 and a lower surface 14 of the wing 10 comprise upper and lower walls of the fuel tank 11, respectively. Similarly, a leading edge spar 15 and a trailing edge spar 16 respectively comprise front and rear walls of the fuel tank 11. The wing 10 further comprises a leading edge 17 ahead of the leading edge spar 15 and a trailing edge 18 behind the trailing edge spar 16.

For safety reasons, electrical cables may not be routed through fuel tanks. Therefore, to provide electrical power to the fuel pump 12, a cable routing 1 must pass from a connection to the fuel pump 12 on the lower surface 14 of the wing 10, along the outside of the lower surface 14 of the wing 10 to proximate the trailing edge spar 16 where a power routing (not shown) to which it is to be connected, is located. As such, a fairing 19 is provided on the lower surface 14 of the wing 10 to cover the cable routing 1 to protect it from environmental elements, and to ensure the wing 10 is aerodynamic.

FIG. 2 shows locations 20 of fairings 19 in a conventional aircraft wing 10 and shows that a number of such fairings 19 are needed to cover all the required cable routings 1. Given the size of the cable routings 1 and therefore the required size of the fairings 20, this results in additional aerodynamic drag on the wing 10 and complexity of construction/installation.

Figure 4:
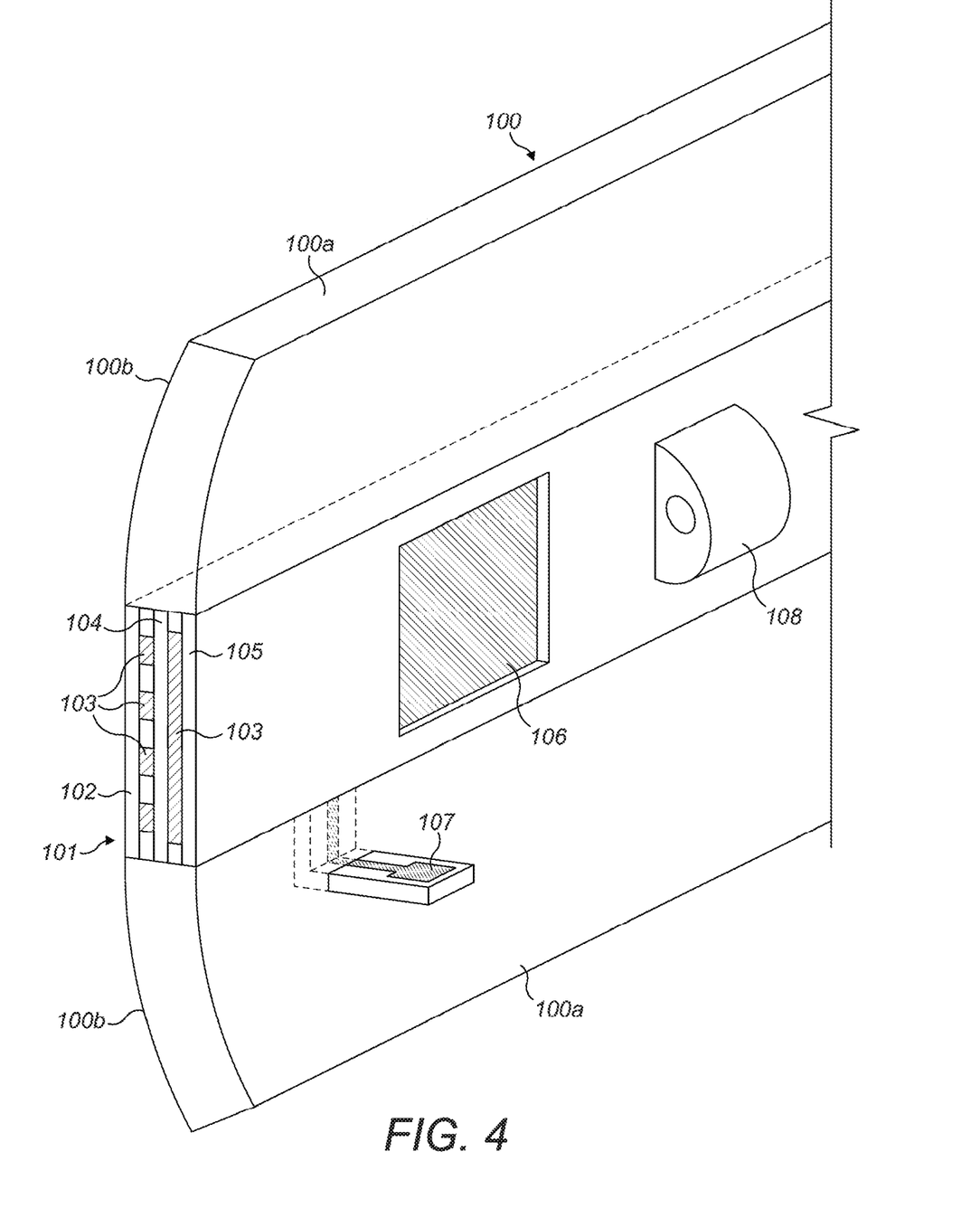
FIG. 4 shows a printed circuit board electrical routing for use in a vehicle fairing of a first embodiment of the invention.

FIG. 4 shows an electrical routing 101 which may be incorporated in a vehicle fairing 100 of a first embodiment of the invention. The electrical routing 101 comprises an elongate printed circuit board (PCB) comprising a first substrate layer 102, a plurality of conductive tracks 103 on the first substrate layer 102, and a second substrate layer 104 sandwiching the conductive tracks 103 between it and the first substrate layer 102. A plurality of conductive tracks 103 are also provided on the second substrate layer 104 and a third substrate layer 105 is provided over these conductive tracks 103 on the second substrate layer 104.

The substrate layers 102, 104, 105 are substantially rigid and are made of a material which has good structural strength and impact resistance, and may be made of polyether ether ketone (PEEK) or polyether ketone ketone (PEKK), Glass Fibre Reinforced Plastic (GFRP) or other suitable material. The PCB electrical routing 101 is formed as part of a vehicle fairing 100. The vehicle fairing 100 is formed by fairing panels 100a disposed adjacent to the PCB electrical routing 101 and connected thereto, to form the overall vehicle fairing 100. The fairing panels 100a may be bonded to the PCB electrical routing 101, or may be moulded therewith, or co-cured or co-bonded therewith.

The vehicle fairing 100 includes an outer surface 100a which, in use, forms part of the outer surface of a vehicle to which the vehicle fairing 100 is attached or incorporated. The first substrate layer 102 includes a surface 102a that forms part of the outer surface 100a of the vehicle fairing 100.

The PCB may include one or more projecting lugs 108 integrally formed with one of the substrate layers 102, 104, 105 to enable the vehicle fairing 100 with incorporated PCB electrical routing 101 to be secured to a vehicle structure. Alternatively, the PCB may include a plurality of slots, keyways, holes or other recess features integrally formed with one of the substrate layers 102, 104, 105 to enable the fairing 100 with incorporated PCB electrical routing 101 to be secured to a vehicle structure by a projecting connector from the vehicle structure.

In use of the vehicle fairing 100 in a vehicle, the PCB electrical routing 101 replaces a conventional electrical routing 1 and the overlying fairing 19, with the various power and/or control signals that would conventionally be conducted through cables 5 of a cable harness 4 instead being conducted through the various conductive tracks 103 of the PCB. The PCB electrical routing 101 of the fairing 100 of the invention is much simpler and therefore quicker to install than a conventional cable routing, as it only required the PCB to be mounted to the vehicle structure as part of the fairing thereof, and does not include multiple different components and fixings. The PCB electrical routing 101 of the fairing 100 of the invention is also lighter and smaller than a conventional electrical routing 1, and so occupies less space on or within a vehicle structure. It is an important property of the PCB electrical routing 101 that it is a rigid assembly where the conductors within it are protected from damage.

The PCB electrical routing 101 of the invention may be connectable to a current return network of the vehicle in which it is installed. As such, one of the conductive layers 103 may be a dedicated conductive element for connection to the vehicle current return network. Such an electrical routing 101 would preferably therefore comprise a multi-layer PCB (as shown in FIG. 4) in which the signal/power conductive tracks 103 are electrically isolated (by being provided on a different substrate layer 102, 104, 105) from the layer of conductive track 103 providing the current return system functionality. The electrical routing 101 may include an exposed section 106 of the conductive track 103 that provides the current return function, in order to be securely electrically bonded to the vehicle current return network. Alternatively, the electrical routing 101 may include an electrical bonding breakout 107 (also shown in FIG. 4 for completeness) for connection to the vehicle current return network.

The PCB of the electrical routing 101 preferably comprises multiple substrate layers 102, 104, 105, and may include additional outer substrate layers, and/or thicker outer substrate layers, such that the electrical routing 101 has the required structural rigidity and damage tolerance whilst allowing for structural deflections of the vehicle in which it and the vehicle fairing 100 is installed.

Figure 5:
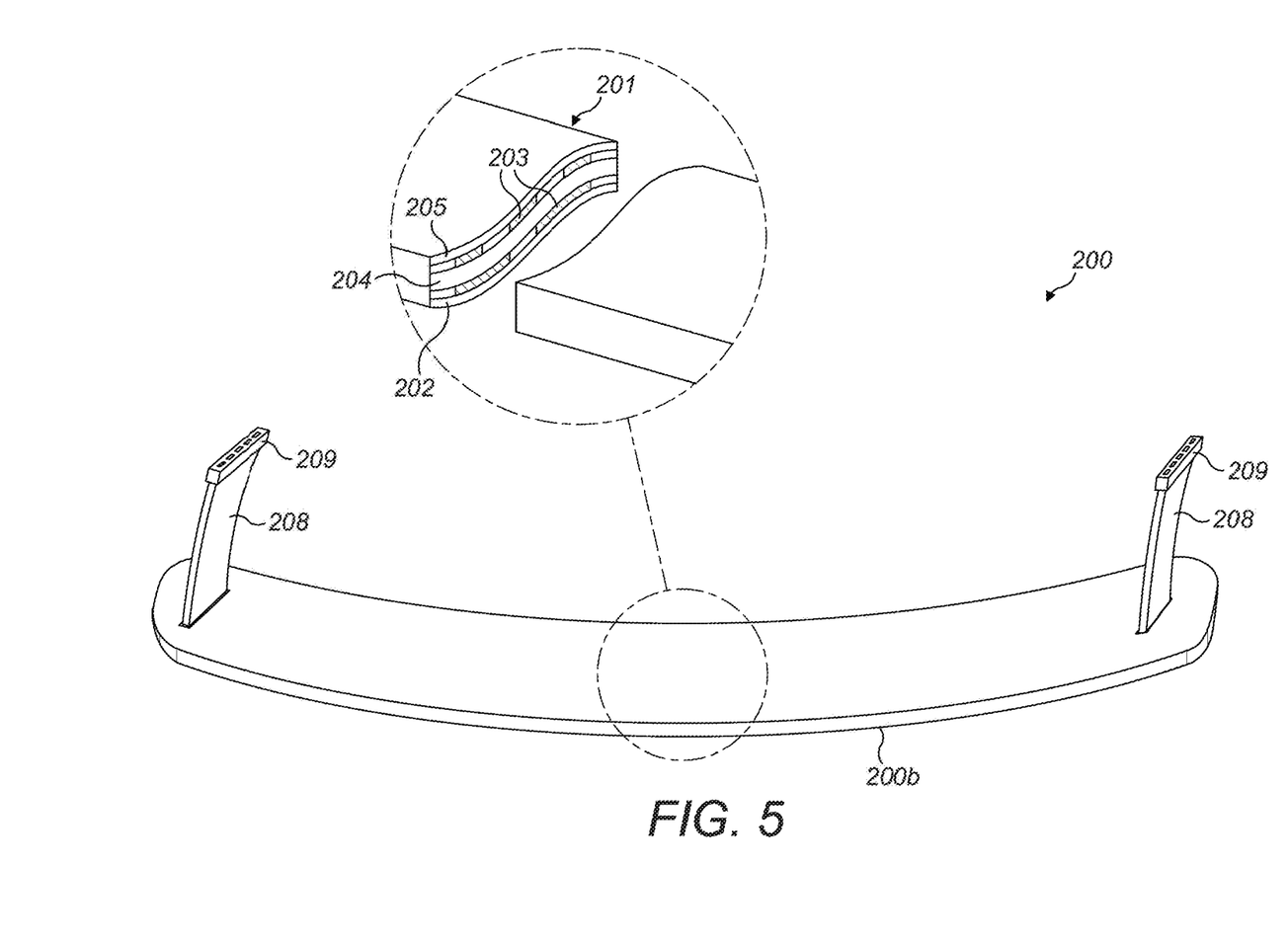
FIG. 5 shows a vehicle fairing of a second embodiment of the invention comprising a printed circuit board electrical routing, with a portion shown as an enlarged cut-away view.
Figure 6:
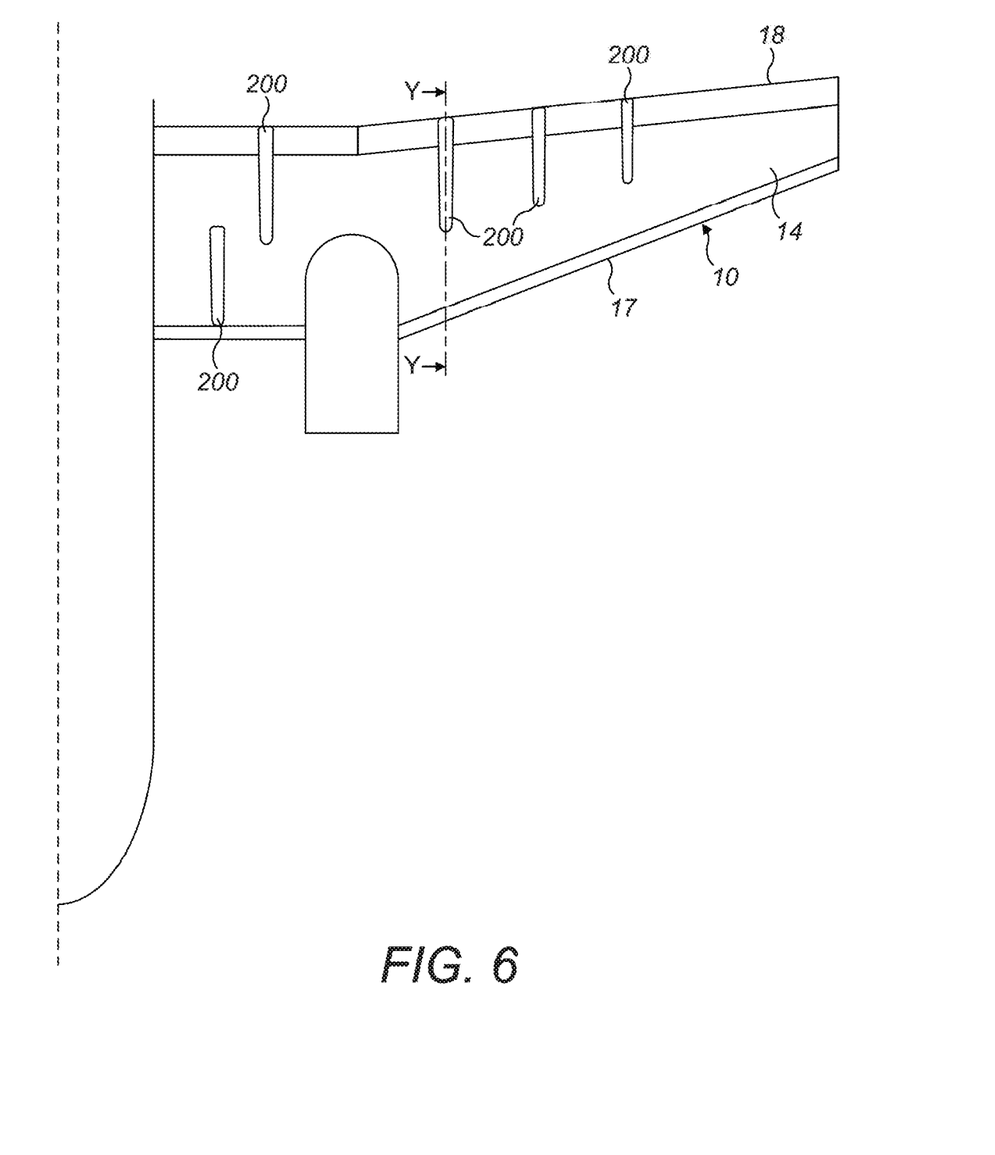
FIG. 6 shows a schematic underside view of one side of an aircraft wing and fuselage incorporating the fairing of FIG. 5.
Figure 7:
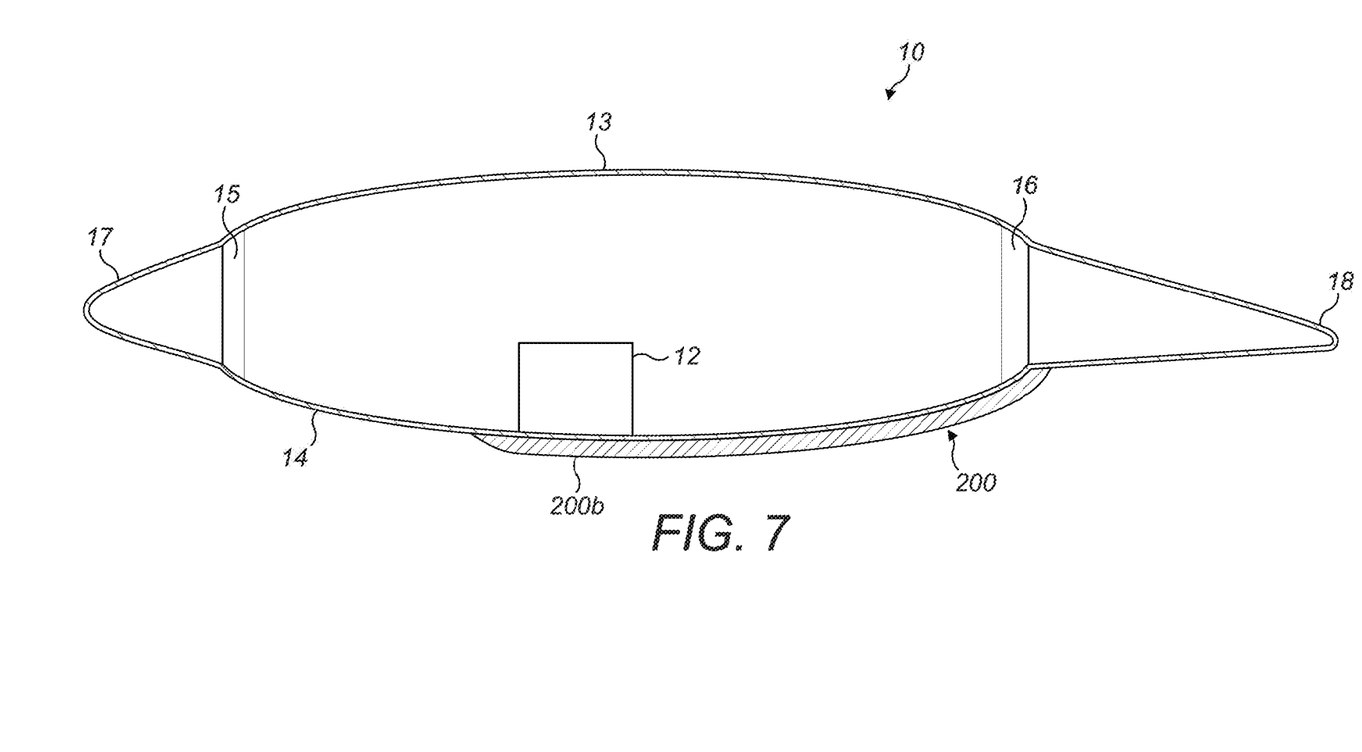
FIG. 7 shows a cross-sectional view along the line Y-Y of the aircraft wing of FIG. 6.

FIG. 5 shows a vehicle fairing 200 a second embodiment of the invention comprising an electrical routing 201. As with the first embodiment, the electrical routing 201 comprises an elongate printed circuit board (PCB) comprising a first, second and third substrate layers 202, 204, 205 and a plurality of conductive tracks 203. However, one difference of the vehicle fairing 200 of the second embodiment is that the PCB electrical routing comprises the entire vehicle fairing component 200. The outer layer 202 of PCB substrate forms an outer wetted surface 200b of the vehicle fairing 200 of the vehicle to which it is secured. The exemplary vehicle fairing 200 shown in FIG. 5 comprises a fuel pump fairing for fitment to the underside of an aircraft wing 10, as shown in FIGS. 6 and 7.

The electrical routing 201 shown in FIG. 5 includes flexible, electrically and mechanically protected leads 208. A first end of each lead 208 is electrically connected to the conductive tracks 203 of the electrical routing 201 and an opposite end of each lead 208 is provided with an electrical connector 209 one for connection to a mating connector of a fuel pump 12 accessible on the lower surface 14 of the aircraft wing 10, and one for connection to the aircraft's power and/or control system (not shown). In an alternative embodiment of electrical routing 201 (not shown), the leads 208 may be omitted and instead the electrical routing 201 may include integrated electrical connectors directly connected to the conductive tracks 203 of the PCB and which connect directly into the electrical components of the vehicle to which the electrical routing is to be coupled, such as the fuel pump 12 of the aircraft wing and electrical/control system of the aircraft.

In use, the vehicle fairing 200 of the second embodiment replaces both a conventional electrical routing 1 and the overlying fairing 19 on the lower surface 14 of the aircraft wing 10, with the various power and/or control signals that would conventionally be conducted through cables 5 of a cable harness 4 instead being conducted through the various conductive tracks 203 of the PCB. This thereby significantly reduces the total number and weight of parts required for the vehicle. Also, the PCB is shaped and profiled in an aerodynamic form such that airflow disturbance and aerodynamic drag are minimised when the vehicle fairing 200 is fitted to the wing 10, with the outer-most substrate layer 202 of the PCB 201 forming the outer wetted surface 200b of the aircraft wing. The combined and integrated component of the fairing 200/electrical routing 201 of the second embodiment of the invention is therefore much simpler and therefore quicker to install than a conventional cable routing, as it only requires the PCB to be mounted to the vehicle structure, and does not include multiple different components and fixings, and negates the need for any additional overlying fairing. The fairing 200/electrical routing 201 of the second embodiment of the invention is also lighter and smaller, and so, as can be seen from FIG. 7, protrudes much less from the lower surface 14 of the aircraft wing 10 than a conventional cable routing 1 and fairing 19 arrangement, significantly reducing aerodynamic drag.

An advantage of the fairings 100, 200 of the present invention is that they can be manufactured more quickly and simply than known types of vehicle components with integrated electrical routings. For example, it is known to produce vehicle structures with embedded wires, which are sometimes known as "wires in composites". Here, conventional electrical routings are embedded into composite components in a multi-stage manufacturing process. However, by forming the PCB electrical routing as part of the external structure of the vehicle fairing, and particularly forming the entire vehicle fairing from the PCB substrate(s), the number of manufacturing steps is reduced, and so cost and time of manufacture is reduced. In particular, a time and energy-consuming autoclave procedure is not required in manufacturing the vehicle fairing of the invention.

The PCB vehicle fairing may be shaped, profiled and packaged to match the vehicle structure shape and space available. The PCB vehicle fairing preferably has a cross-section and profile shape that minimises air flow disturbance and results in minimal aerodynamic drag.

Although the electrical routing of the first embodiment of the invention is shown as having three substrate layers 102, 104, 105, the invention is not limited to this configuration and an electrical PCB routing of the invention may have a single layer of substrate with a single layer of conductive tracks, or may comprise any number of multiple layers of substrate with multiple layers of conductive tracks.

It will be appreciated from the description above and exemplary embodiments that within the present inventive concept, the PCB electrical routing 101, 201 may comprise a portion of the outer surface 100b of the vehicle fairing 100, or may comprise the entire outer surface 200b of the vehicle fairing 200. Also, although described above in the context of an aircraft fairing, the invention is not intended to be limited to such fairings and may comprise fairings used for any other type of vehicle, such as cars, trucks, boats, trains, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fairing attached to an aircraft structure, the aircraft fairing comprising:
   an electrical routing configured to conduct electrical power or control signals between spaced-apart components of the aircraft structure,
   an outer surface of the aircraft fairing configured to form part of an outer surface of an assembly of the aircraft fairing and the aircraft structure, and
   fairing panels disposed adjacent to the printed circuit board and connected thereto, wherein the printed circuit board is a center strip of the aircraft fairing and the fairing panels are disposed on opposite side edges of the printed circuit board,
   wherein the electrical routing comprises a printed circuit board having a substrate and a first conductive path for conduction of the electrical power or control signals provided on the substrate;
   wherein the substrate is substantially rigid and the substrate is formed of substrate layers including an outer substrate layer that forms at least a portion of the outer surface of the aircraft fairing.

2. The vehicle fairing according to claim 1, wherein the electrical routing includes a second conductive path and the first conductive path is electrically isolated from the second conductive path.

3. The aircraft fairing according to claim 2, further comprising a third conductive path configured as a current return path, and the third conductive path is sandwiched between a first pair of the substrate layers, and the first and second conductive paths are sandwiched between a second pair of the substrate layers.

4. The aircraft fairing according to claim 3, wherein the electrical routing comprises a unitary assembly.

5. The aircraft fairing according to claim 4, wherein the first pair of the substrate layers includes the outer substrate layer.

6. The aircraft fairing according to claim 3, wherein the outer substrate layer includes an exposed section of the second conductive path.

7. The aircraft fairing according to claim 1, wherein the substrate of the printed circuit board comprises at least one of: polyether ether ketone (PEEK), polyether ketone ketone (PEKK) and Glass Fibre Reinforced Plastic (GFRP).

8. The aircraft fairing according to claim 1, wherein the printed circuit board comprises at least one mounting lug integrally formed as a single piece component with the substrate layers, and the at least one projecting lug is configured to secure the printed circuit board to the aircraft structure.

9. The aircraft fairing according to claim 1, wherein the outer substrate layer forms an entire outer surface of the aircraft fairing.

10. The aircraft fairing according to claim 1, wherein the aircraft fairing is an aircraft wing fairing.

11. The aircraft fairing according to claim 10 configured to be connected to an outer surface of an underside of an aircraft wing, and extend aft from a mid-section of the aircraft wing to a trailing edge spar of the aircraft wing.

12. The aircraft fairing according to claim 1, wherein the fairing panels and the outer substrate layer form a continuous surface.

13. The aircraft fairing according to claim 1, wherein the outer substrate layer comprises first and second surfaces, wherein the first conductive path is provided on the first surface and the second surface forms at least a portion of the outer surface of the aircraft fairing.

14. The aircraft fairing according to claim 13, wherein the first and second surfaces face in opposite directions.

15. The aircraft fairing according to claim 1, wherein:
   the first conductive path and the second conductive path are sandwiched between different pairs of the substrate layers, and one of the pairs includes the outer substrate layer.

16. An aircraft structure assembly comprising:
   an aircraft structure including an outer surface,
   an electrical component, and
   an aircraft fairing connected to the outer surface of the aircraft structure, wherein the aircraft fairing includes:
      an electrical routing connected to the electrical component configured to convey electrical power or control signals to the electrical component,
      an outer surface configured to form part of an outer surface of an aircraft body, wherein the electrical routing comprises a printed circuit board including a substrate formed of substrate layers, wherein a first conductive path of the printed circuit board is configured for conduction of the electrical power or control signals and the first conductive path provided between a pair of the substrate layers, wherein an outer substrate layer forms at least a portion of the outer surface of the aircraft fairing, and
      fairing panels disposed adjacent to the printed circuit board and connected thereto, wherein the printed circuit board is a center strip of the aircraft fairing and the fairing panels are disposed on opposite side edges of the printed circuit board.

17. An aircraft structure assembly comprising:
   an aircraft structure including an outer surface,
   an electrical component, and
   an aircraft fairing connected to the outer surface of the aircraft structure, wherein the aircraft fairing includes:
      an electrical routing connected to the electrical component configured to convey electrical power or control signals to the electrical component,
      an outer surface configured to form part of an outer surface of an aircraft body, wherein the electrical routing comprises a printed circuit board including a substrate formed of substrate layers, wherein a first conductive path of the printed circuit board is configured for conduction of the electrical power or control signals and the first conductive path provided between a pair of the substrate layers,
   wherein an outer substrate layer forms at least a portion of the outer surface of the aircraft fairing, and
   wherein:
      the first conductive path is provided on a first layer of the substrate and a second conductive path is provided on a second layer of the substrate, and
      the second conductive path being electrically insulated from the first conductive path,
      wherein the aircraft structure further comprises a current return network, and
      wherein the second conductive path is a current return path and is electrically connected to the current return network.

18. The aircraft structure assembly according to claim 17, wherein the printed circuit board comprises a lead with a connector configured to electrically connect the printed circuit board to an electrical system of the aircraft.

19. An aircraft wing assembly including:
an aircraft wing including an outer wing surface extending in both a chordwise and spanwise direction of the aircraft wing, an internal spar extending in the spanwise direction, and
an electrical routing proximate to the internal spar;
a fuel tank within the aircraft wing;
a fuel pump within the fuel tank, and
an aircraft fairing mounted to the outer wing surface of the aircraft wing, the aircraft fairing having a width in the spanwise direction and a length in the chordwise direction longer than the width, and the fairing comprising:
an electrical routing electrically connected to the fuel pump and to the electrical routing; and configured to covey, external to the aircraft wing, electrical power or control signals between the electrical component and the electrical routing;
the electrical routing comprising a printed circuit board having substrate layers, wherein a first conductive path configured for conduction of the electrical current or the control signals is sandwiched between a first pair of the substrate layers and a second conductive path configured to form an electrical return path is sandwiched between a second pair of the substrate layers, wherein a first outer substrate layer of the substrate layers forms at least a portion of a wetted outer surface of the aircraft fairing and a second outer substrate layer of the substrate layers forms a second outer surface facing the outer wing surface.

20. The aircraft wing assembly of claim 19, wherein the outer wing surface is a lower skin surface, and the fairing extends from a mid-section of the aircraft wing towards either a leading or trailing edge of the wing.

21. The aircraft wing assembly of claim 20, wherein the internal spar is a rear spar, and the fairing extends to the rear spar along the lower skin surface.

22. The aircraft wing assembly of claim 20, wherein the second outer substrate layer includes an opening exposing a portion of the second conductive path, and the fairing further includes an electrical bonding breakout extending from the second outer substrate layer and providing an electrical connection to the first conductive path.

23. The aircraft wing assembly of claim 22, wherein the opening and the electrical bonding breakout are proximate to each other.

* * * * *